US006532241B1

(12) United States Patent
Ferguson et al.

(10) Patent No.: US 6,532,241 B1
(45) Date of Patent: Mar. 11, 2003

(54) METHOD AND APPARATUS FOR DETERMINING SNA SESSIONS USING VARIOUS PROTOCOLS FOR TRANSPORT BASED ON FILTER CRITERIA

(75) Inventors: Darin Ferguson, Raleigh, NC (US); Robert Clouston, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/315,441

(22) Filed: May 20, 1999

(51) Int. Cl.[7] .................................................. H04J 3/22
(52) U.S. Cl. ........................ 370/469; 370/466; 370/467; 370/465; 709/200; 709/222; 709/223; 709/226; 709/230; 709/239
(58) Field of Search ................................. 370/469, 465, 370/466, 467; 709/200, 222, 223, 226, 228, 229, 230, 238, 239

(56) References Cited

U.S. PATENT DOCUMENTS

| | | | |
|---|---|---|---|
| 4,644,532 A | 2/1987 | George et al. ................. 370/94 |
| 4,827,411 A | 5/1989 | Arrowood et al. ........... 364/300 |
| 4,864,559 A | 9/1989 | Perlman ....................... 370/60 |
| 4,893,307 A | 1/1990 | McKay et al. .............. 370/94.1 |
| 5,021,949 A | 6/1991 | Morton et al. ............... 364/200 |
| 5,027,350 A | 6/1991 | Marshall ................... 370/85.13 |
| 5,142,622 A | 8/1992 | Owens ........................ 395/200 |
| 5,361,256 A | 11/1994 | Doeringer et al. ............ 370/60 |
| 5,371,852 A | 12/1994 | Attanasio et al. ........... 395/200 |
| 5,394,402 A | 2/1995 | Ross ......................... 370/94.1 |
| 5,473,608 A | 12/1995 | Gagne et al. ............. 370/85.13 |
| 5,491,796 A | 2/1996 | Wanderer et al. ....... 395/200.09 |
| 5,511,168 A | 4/1996 | Perlman et al. ........ 395/200.15 |
| 5,517,622 A | 5/1996 | Ivanoff et al. .......... 395/200.13 |
| 5,612,959 A | 3/1997 | Takase et al. ................ 370/390 |
| 5,617,421 A | 4/1997 | Chin et al. ................... 370/402 |
| 5,675,740 A | 10/1997 | Heimsoth et al. ....... 395/200.12 |
| 5,678,006 A | 10/1997 | Valizadeth et al. ..... 395/200.02 |
| 5,684,800 A | 11/1997 | Dobbins et al. ............. 370/401 |
| 5,684,988 A | 11/1997 | Pitchaikani et al. ......... 395/615 |
| 5,694,595 A | 12/1997 | Jacobs et al. ................ 395/609 |
| 5,740,171 A | 4/1998 | Mazzola et al. ............. 370/392 |
| 5,742,604 A | 4/1998 | Edsall et al. ................. 370/401 |
| 5,752,003 A | 5/1998 | Hart ............................ 395/500 |
| 5,764,636 A | 6/1998 | Edsall ......................... 370/401 |
| 5,796,732 A | 8/1998 | Mazzola et al. ............. 370/362 |
| 5,802,053 A | 9/1998 | Bollella et al. ............. 370/401 |
| 5,802,313 A | 9/1998 | Mitchell et al. ......... 395/200.68 |
| 5,835,728 A | 11/1998 | Shinomiya et al. ..... 395/200.72 |
| 5,845,081 A | 12/1998 | Rangarajan et al. .... 395/200.54 |

OTHER PUBLICATIONS

World Wide Web page http://www.cisco.com/univercd/cc/td/doc/cisintwk/ito_doc/dlsw.html, *Data–Link Switching (DLSw)*, Feb. 23, 1999, pp. 1–8.

World Wide Web page http://www.cisco.com/warp/public/558/16.html, *Cisco Catalyst Workgroup Switch Version 3.0*, Jul. 15, 1998, pp. 1–5.

World Wide Web page http://www.cisco.com/warp/public/539/7.html, *Cisco VLAN Roadmap*, Jul. 15, 1998, pp. 1–9.

Draft Standard for Virtual Bridged Local Area Networks, P802.1Q/D6, May 16, 1997, pp. 1–10, 70–72.

IAC Newsletter Database, *Cisco Announces New Fast Ethernet Interface*, Apr. 15, 1995, pp. 2–3.

IAC Newsletter Database, *Cisco Announces Token–Ring Switching Products*, Apr. 15, 1995, pp. 4–5.

Wells, et al., DLSw Standardwk, *Data Link Switching: Switch–to–Switch Protocol*, Apr. 1995, pp. 1–91.

*Primary Examiner*—Douglas Olms
*Assistant Examiner*—Van Kim T. Nguyen
(74) *Attorney, Agent, or Firm*—Cesari and McKenna, LLP

(57) ABSTRACT

A technique identifies a data session flowing through entities of a multi-protocol network based on information contained within a service request provided by a user of the network and without requiring knowledge of the protocols used by the session. A translation server translates the service request into session parameters for use by a correlation engine. The correlation engine creates at least one filter containing searching criteria pertaining to the session and passes the filter to at least one protocol server configured to obtain specific protocol-related information pertaining to the session. The protocol server searches a repository for information matching the filter and, if found, returns a list of sessions.

20 Claims, 8 Drawing Sheets

TABLE I

| EXACT MATCHED | PU NAME | PU TYPE | PU STATUS | PROTOCOLS | NUMBER OF MATCHED FILTERS |
|---|---|---|---|---|---|
| YES | ABCA1 | 2.0 | ACTIVE | DLSw,VTAM | 4 |
| YES | ABCB1 | 2.0 | ACTIVE | DLSw,VTAM | 4 |
| YES | ABCC1 | 2.0 | ACTIVE | DLSw,VTAM | 4 |
| NO | ABCA2 | 2.0 | INACTIVE | DLSw,VTAM | 3 |
| NO | ABCB2 | 2.1 | ACTIVE | DLSw,VTAM | 3 |
| NO | ABCC2 | 2.0 | ACTIVE | RSRB,VTAM | 3 |
| NO | ABCA3 | 2.1 | INACTIVE | DLSw,VTAM | 2 |
| NO | ABCB3 | 2.1 | ACTIVE | RSRB,VTAM | 2 |
| NO | ABCC3 | 2.0 | INACTIVE | RSRB,VTAM | 2 |
| NO | ABCA4 | 2.1 | INACTIVE | RSRB,VTAM | 1 |
| NO | ABCB4 | 2.1 | UNKNOWN | APPN,VTAM | 1 |
| NO | ABCC4 | 2.1 | PENDING | TN3270,VTAM | 1 |

FIG. 8

METHOD AND APPARATUS FOR DETERMINING SNA SESSIONS USING VARIOUS PROTOCOLS FOR TRANSPORT BASED ON FILTER CRITERIA

CROSS-REFERENCE TO RELATED APPLICATIONS

The present invention is related to the following copending and commonly asigned U.S. Patent Applications:

U.S. patent application Ser. No. 08/999,271 titled, Technique for Correlating Logical Names with IP Addresses on Internetworking Platforms, by Wayne Clark et al., filed on Dec. 29, 1997;

U.S. patent application Ser. No. 09/315,550 titled, Method and Apparatus for SNA/IP Correlation with Multiple DLSw Peer Connections, by Darin Ferguson et al., filed herewith;

U.S. patent application Ser. No. 09/315,551 titled, Method and Apparatus for SNA/IP Correlation in a Mixed APPN and DLSw Network, by Darin Ferguson et al., filed herewith;

U.S. patent application Ser. No. 09/315,443 titled, Method and Apparatus for Determining a Path for a Session Using Various Protocols for Transport, by Darin Ferguson et al., filed herewith; and U.S. patent application Ser. No. 09/315,284 titled, Method and Apparatus for Establishing a Database Used for Correlating Information Gathered via SNMP, by Darin Ferguson et al., filed herewith, each application of which is hereby incorporated by reference as though fully set forth herein.

FIELD OF THE INVENTION

The present invention relates to computer networks and, more particularly, to management of entities in a multi-protocol computer network.

BACKGROUND OF THE INVENTION

Data communications in a computer network involves the exchange of data between two or more entities interconnected by communication links and subnetworks. These networks are typically software programs executing on hardware computer platforms which, depending on their roles within a network, may serve as host stations, end stations or intermediate stations. Examples of intermediate stations include routers, bridges and switches that interconnect communication links in subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on that data as it passed through each layer, and the layers communicate with each other by means of the pre-defined protocols. This design permits each layer to offer selected services to other layers using a standardized interface that shields the other layers from details of actual implementation of the services. The lower layers of these architectures are generally standardized and implemented in hardware and firmware, whereas the higher layers are usually implemented in the form of software. Examples of such communications architectures include the System Network Architecture (SNA) developed by International Business Machines (IBM) Corporation and the Internet Communications Architecture.

The Internet architecture is represented by four layers termed, in ascending interfacing order, the network interface, internetwork, transport and application layers. The primary internetwork layer protocol of the Internet architecture is the Internet Protocol (IP). IP is primarily a connectionless protocol that provides for internetworking routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture; the TCP/IP architecture is discussed in *Computer Networks, 3rd edition*, by Andrew S. Tanenbaum, published by Prentice-Hall, PTR in 1996, all disclosures of which are incorporated herein by reference, particularly at pages 28–54.

SNA is a communications framework widely used to define network functions and establish standards for enabling different models of IBM computers to exchange and process data. SNA is essentially a design philosophy that separates network communications into several layers termed, in ascending order, the physical control, the data link control, the path control, the transmission control, the data flow control, the presentation services and the transaction services layers. Each of these layers represents a graduated level of function moving upward from physical connections to application software.

In the SNA architecture, the data link control layer is responsible for transmission of data from one end station to another. Bridges or devices in the data link control layer that are used to connect two or more LANs so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 logical link control type 2 (LLC2) or "data link control" connection, is established between the source and destination stations. Once the connection has been established, data is transferred sequentially over the path and, when the LLC2 connection is no longer needed, the path is terminated. Reliable communication of the LLC2 (DLC) is well known and described by Andrew Tanenbaum in his book *Computer Networks, Second Edition*, published in 1988, all disclosures of which are incorporated herein by reference, especially at pages 253–257.

FIG. 1 is a schematic block diagram of a conventional computer network 100 having a host computer coupled to a Token Ring (TR) network TR1 and an end station coupled to TR2. The TR networks are of the type that support Source/Route Bridging (SRB) operations with respect to the contents of a routing information field (RIF) of a frame. The host computer is preferably a SNA host entity comprising a host mainframe computer 110 coupled to a channel-attached router or a front end processor (FEP), such as an IBM 3745 network control processor, hereinafter referred to as the "host network connection" 112. In addition, the end station is an SNA entity 114 comprising a "physical unit" (PU) and a "logical unit" (LU) which consists of logical services by which a user may access the SNA network. A control unit 106 (such as IBM 3174) interconnects TR1 and TR2 such that the SRB network 100 effectively functions as a LAN. SNA protocols, such as a hierarchical sub-area SNA protocol that defines a connection path between the PU and host, are used throughout the network.

In an alternate embodiment of network 100, Remote Source Route Bridging (RSRB) routers 1,2 operate in conjunction with the host network connection 112 to provide IP connectivity over a TCP/IP cloud 110 with the SNA network 100. RSRB is a software component in each router that permits transmission of TR frame traffic across an IP network. Specifically, RSRB functions to give the IP network the appearance of a single, virtual token ring (VTR) "hop" in a TR network. The association of the two adjacent RSRB routers is called a "peer" relation and this relation must exist to exchange RSRB traffic across the VTR.

The PU entity communicates with the host by exchanging TR frames over LLC2 connections or sessions through the SRB network. Each TR frame 120 includes a RIF 122 that contains source route information in the form of ring number/bridge number pair "hops" within a path between the stations. An LLC2 session is established between the stations using a special TR frame, called an explorer frame. The explorer frame is used by a source (PU) to "discover" the path to a destination (host); thereafter, a Set Asynchronous Balanced Mode Extended (SABME) frame is sent from the PU to the host to establish a logical connection between the end stations, and the host responds to the SABME frame with an Unnumbered Acknowledgment (UA) frame. Once the UA frame is received by the PU, a connection is established between the source and destination, and these stations communicate by exchanging TR information (INFO) and acknowledgment frames until the logical link SNA session is completed.

For example, the PU transmits an INFO frame over TR2 and through the control unit and TR1 to the host. Upon successfully receiving the INFO frame, the host responds by transmitting an LLC2 Receive/Ready (RR) acknowledgment frame over the SRB network to the PU. This INFO/RR exchange continues until the PU has successfully transmitted all of its data and the host has successfully received all of that data. Session completion is then initiated by a Disconnected Mode (DM) frame being transmitted from the PU to the host; the disconnection is thereafter acknowledged by the host responding with a UA frame. The LLC2 frames (packets) are described by Radia Perlman in her book *Interconnections, Bridges and Routers*, published by Addison Wellesly Publishing Company, in 1992, all disclosures in which are incorporated herein by reference, particularly at pages 33–34.

In a SNA network, applications executing on end stations typically access the network through LUs of the stations; accordingly, in a typical SNA network, a communication session may connect two LUs in a LU-LU session. Advanced Peer to Peer Networking (APPN) functions generally include session establishment and session routing within an APPN network. FIG. 2 is a schematic block diagram of an APPN network 200 comprising a host 202 coupled to a host network connection entity 206 and a PU entity 212 coupled to token ring (TR) LAN TRI. During session establishment, an end station (such as PU 212) requests an optimum route for a session between two LUs; this route is calculated and conveyed to PU 212 by an intermediate station (e.g., station 216) via a LOCATE message exchange through the network 200. Thereafter, a "set-up" or BIND message is forwarded over the route to initiate the session. The BIND includes information pertaining to the partner LU requested for the session.

Intermediate session routing occurs when the intermediate station 216, configured as an APPN network node (NN), is present in a session between the two end nodes. As can be seen, the APPN network node is connected to an APPN/WAN 210 that includes additional APPN NNs to extend the APPN architecture throughout the network. The APPN network nodes forward packets of a LU-LU session over the calculated route between the two APPN end nodes. An APPN network node is a fill-functioning APPN router node having all APPN base service capabilities, including session services functions. An APPN end node, on the other hand, is capable of performing only a subset of the functions provided by an APPN network node. APPN network and end nodes are well-known and are, for example, described in detail in *Systems Network Architecture Advanced Peer to Peer Networking Architecture Reference* IBM Doc SC30–3422 and *APPN Networks* by Jesper Nilausen, printed by John Wiley and Sons, 1994, at pgs 1–83.

The APPN router node may provide Dependent LU Requester (DLUR) services on behalf of the PU ("dependent" LU) in network 200 while a virtual telecommunication access method (VTAM) on the host 202 may provide Dependent LU Server (DLUS) services. The DLUS host may be coupled to the DLUR router by way of a "pipe" connection over which control traffic for the dependent session flows. The DLUR router essentially functions as a "surrogate" for the downstream PU with respect to the DLUS host such that the control information flows over the network to the PU by way of the DLUR router.

Data Link Switching (DLSw) is a mechanism for forwarding SNA protocol frames over, e.g., a TCP/IP backbone WAN such as the Internet. In traditional bridging, the data link connection is end-to-end, i.e., effectively continuous between communicating end stations. A stream of data frames originating from a source station on a source LAN traverses one or more bridges specified in the path over the LLC2 (DLC) connection to a destination station on a destination LAN. In a network implementing DLSw, by contrast, the LLC2 connection terminates at a local DLSw device entity, e.g., a router. An example of a DLSw network arrangement may comprise a host DLSw router connected to a host computer via a host LAN and a remote DLSw router connected to a remote LAN having a destination station. The LANs that are accessed through the DLSw routers may appear as SRB subnetworks attached to adjacent rings; each of these adjacent rings manifest as a virtual ring within each DLSw router that effectively terminates the SRB network.

A DLSw network is formed when two DLSw devices interconnect the end nodes of a SNA network by way of the IP network; the DLSw devices preferably communicate using a Switch-to-Switch protocol (SSP) that provides packet "bridging" operations at the LLC (i.e., DLC) protocol layer. FIG. 3 is a schematic block diagram of a DLSw network 300 having a TCP/IP cloud 310 disposed between host and remote SRB subnetworks 320, 330. Each SRB subnetwork comprises a DLSw router 1, 2 coupled to a host/host is network connection 302, 304 and PU/LU 312 via TR1 and 2, respectively. The DLSw routers function as end points between TCP sessions over the TCP/IP cloud when transporting TR frames associated with DLC sessions over that intermediate network. In an alternate embodiment of network 300, RSRB routers 1, 2 may be substituted for DLSw routers 1, 2.

Broadly stated, each DLSw router establishes a "peer relationship" to the other DLSw router in accordance with a conventional capabilities exchange message sequence, and the logical and physical connections between these routers connect the subnetworks into a larger DLSw network. To establish a peer connection in accordance with an implementation of DLSw switching, the host DLSw router first opens logical TCP (Read/Write) "pipe" connections to the remote DLSw router using a conventional socket technique to create a socket into the transport layer of the protocol stack. Once the TCP pipes are established, the SSP protocol is used to transport the capabilities exchange messages between the two DLSw routers.

The capability exchange messages contain various parameters, such as the number of pipes used for communicating between the DLSw routers and the largest frame size supported by the routers. Each DLSw router responds to each capability exchange message issued by its peer router with a capability exchange response message. Upon completion of the exchange, each router reconfigures itself to "act upon" the agreed capabilities and the peer connection is established. Establishment of a peer connection can occur automatically upon "boot-up" of each DLSw router; that is, as soon as a DLSw router activates, it connects with its DLSw peer. The DLSw forwarding mechanism is well known and described in detail in Request For Comment (RFC) 1795 by Wells & Bartky, 1995 at pgs 1–91.

DLSw routers can establish multiple parallel TCP sessions using well-known port numbers. All frames associated with a particular LLC2 connection typically follow a single designated TCP session. Accordingly, SNA data frames originating at the PU are transmitted over a particular LLC2 connection along TR2 to DLSw2, where they are encapsulated within a designated TCP session and transported over the TCP/IP cloud 310. The encapsulated messages are received by DLSw1, decapsulated to their original frames and transmitted over a corresponding LLC2 connection of TRI to the host in the order received by DLSw2 from the PU.

The LLC2 connection between the PU and host is identified by a data link identifier (ID) 360 consisting of a pair of attachment addresses associated with each end station. Each attachment address is represented by the concatenation of a media access control (MAC) address (6 bytes) and a LLC service access point (SAP) address (1 byte). Specifically, each attachment address is classified as either a target address comprising a destination MAC (DMAC) and a destination SAP (DSAP), or an origin address comprising a source MAC (SMAC) and source SAP (SSAP) addresses. The attachment addresses are contained in the TRs frame exchanged between the PU and host entities.

Furthermore, the designated TCP session is identified by a pair of circuit IDs 370, each comprising a 64-bit number that identifies the LLC2 circuit within a DLSw circuit. The DLSw circuit ID generally comprises a data link circuit port ID (4 bytes) and a data link correlator (4 bytes). A pair of circuit IDs along with a data link ID uniquely identifies a single end-to-end circuit through the network. Notably, each DLSw router maintains a table 350 comprising a plurality of data link ID and corresponding DLSw circuit ID pair entries. In order to associate LLC2 frame traffic with a corresponding DLSw circuit when communicating over the IP cloud, each DLSw router typically indexes into the table (the "DLSw table") using a data link ID to find the corresponding DLSw circuit IDs.

FIG. 4 is a schematic block diagram of a conventional network 400 wherein a host mainframe 402 is coupled to a Telnet 3270 server 404, which preferably executes on a channel-attached router. The TN3270 router is coupled to an end station 408 over a TCP/IP cloud 406. Here, the end station 408 employs the TCP/IP protocol to establish a SNA connection with the host via a telnet connection with the TN3270 router. The Telnet connection is well known to the Internet community and described in RFCs 854, 860 and 862.

When managing a multi-protocol TCP/IP-based SNA network, the routers and protocols used for carrying the SNA sessions, along with information pertaining to the protocols, must be known in order to diagnose points of failure for those sessions behaving improperly or to determine the sessions that may be affected when performing maintenance on the routers. For example in DLSw network 300, information about the DLSw protocols used to transport SNA session traffic is available to a network operator of a network management station (NMS) 380 via a Simple Network Management Protocol (SNMP). The DLSw circuit information described above, including the data link IDs, are available to the NMS 380 by accessing DLSw management information base (MIB) tables within the routers using SNMP. The MIB and SNMP protocol, and their use in providing network management information between SNMP management stations and agents are well-known and described in, e.g., *SNMP, SNMPv2* and *RMON* by William Stallings, printed by Addison Wesley Publishing Company, 1996.

An outage involving a PU session in the network 300 may be diagnosed by the network operator using a conventional approach that correlates SNA frame traffic sessions to DLSw routers for a network having a peer connection over an IP cloud between DLSw peer routers. Typically, management of the SNA entities takes place on the host in accordance with a network management application program, such as NetView, executing on the host. The application can access the status of the PU entity by virtue of its definition contained in a specialized data structure 390 of the host network connection. This data structure is a VTAM table 390 having entries whose contents define all the PUs with respect to the host. The content definitions of the entries comprise a name (e.g. PU name 392) along with an identifier block number/identifier number (IDBLK/IDNUM 394) or control point (CP) name that uniquely identifies each PU on a network at a given time.

The NetView application manages those SNA resources known to it; as used in this context, the term "managing" means that the application program can check and change the status of the resources, and can further control those resources to acquire, e.g., information leading to the traffic patterns of the resources. However, the NetView application cannot manage the component in the routers that encapsulate SNA traffic. As noted, the DLSw routers are preferably managed by the SNMP tool executing on the NMS which communicates with SNMP agents resident on the routers.

According to the conventional approach, the NMS communicates with an SNMP agent in each DLSw router to acquire DLSw MIB information including a data link ID identifying a DLSw circuit associated with the router. Since the host computer "owns" SNA sessions in the network, it maintains SNA-specific information (in addition to the PU name) such as the MAC/SAP addresses 396 for the host network connection and the PU on VTAM 390 in the host. A SNA View application is also resident on the host and used to acquire the MAC/SAP addresses and PU names. SNA View also communicates with VTAM to collect static definition information associated with the PU name if the PU is statically defined.

A complementary version of SNA View (i.e., CiscoWorks Blue SNA View) executes on the NMS and communicates with the host application over a logical TCP/IP (or LU 6.2) "pipe" connection 385. The SNA View application on the NMS obtains the SNA-specific information from VTAM 390 over the pipe 385 and stores that information on a storage repository, such as a NMS database 382, of the NMS. In the case of DLSw network 300, the SNA-specific information retrieved from VTAM does not include information with respect to the DLSw routers that are routing the session traffic. Using the PU name of a session, an SNMP manager on the NMS may then correlate local and remote MAC/SAP addresses to the PU name in accordance with a conventional correlation procedure. Thereafter, the NMS can draw the topology of the DLSw network, including the DLSw circuit and PU session, to isolate any failures in the network.

A typical problem that arises with each of the networks of FIGS. 1–4 is that a customer cannot connect an end station into the network. As a result, the customer calls a network operator which uses conventional tools (such as CiscoWorks Blue SNA View and various CiscoWorks Blue Maps products) to diagnose the problem in the particular network. For example, the SNA View tool may be used to diagnose network 100 (FIG. 1), an APPN Maps application tool may be used to diagnose network 200 (FIG. 2), DLSw Maps and RSRB Maps application tools may be used for the configurations of FIG. 3, and a TN3270 monitor application may be used to diagnose network 400 (FIG. 4). The TN3270 monitor provides a list of PU sessions and status within a TN3270 network.

Utilizing these conventional tools, the NMS may display sessions of a particular protocol and perform a certain level of "filtering" (i.e., searching) within the protocol. For example if the customer provides the name of the end station (PU) that cannot connect into the network, then the operator may invoke the SNA View tool to search for sessions based on that PU name because SNA traffic applies across all of the network configurations of FIGS. 1–4. The NMS may thus filter and display, e.g., all physical unit (PU) sessions known to VTAM and all VTAM PU sessions having names starting with a particular character sequence. SNA View would also enable display of the active/inactive status and other relevant information pertaining to the session.

To obtain further information, the operator investigates use of all available protocol tools, particularly if the customer has no detailed knowledge of its installed network. For example, the operator may invoke the APPN Maps and DLSw Maps tools to determine whether they have any knowledge of the particular PU session. The DLSw Maps tool includes a display screen that allows input of filtering criteria, such as a PU name. In response to the criteria, the tool provides a list of DLSw circuits that represent (carry) PU sessions and that meet the particular filter criteria. The circuit information includes local and remote MAC/SAP addresses of the circuits. The CiscoWorks SNA View product enables access to the VTAM information in the host to allow correlation between the DLSw circuit information and the PU names from VTAM using the MAC/SAP addresses. However, these conventional tools cannot provide a list of circuits (sessions) based on filter criteria without specifying the protocol.

Thus, it would be desirable to show all sessions in a network, regardless of protocol, that have a particular filter criteria, such as a PU name, MAC/SAP address or IP address of the PU. The present invention is directed to a technique for obtaining SNA PU session information pertaining to the filter criteria. In addition, the invention is generally directed to discovering the type of protocols used in network at a customer site without having to rely on the customer for specific information. In particular, the invention is directed to a technique for identifying a session in a customer's network without knowledge of the protocols being employed.

SUMMARY OF THE INVENTION

The present invention comprises a technique for identifying a data session flowing through entities of a multi-protocol network based on information contained within a service request provided by a user of the network and without requiring knowledge of the protocols used by the session. The entities comprise a System Network Architecture (SNA) host mainframe ("host"), an end station and intermediate stations, such as routers. Information about the protocols used in the network is initially acquired by a network management station (NMS) coupled to the network. In the case of an SNA data session, information about the session is acquired from a virtual telecommunications access method (VTAM) table on the host and from management information bases (MIBs) provided by routers executing protocols utilized by the SNA session.

The NMS comprises a translation server configured to translate the service requests into session parameters for use by a novel correlation engine. The NMS further comprises an application protocol server including a plurality of protocol servers, each of which is configured to obtain specific protocol-related information pertaining to the session. In the illustrative embodiment, the protocol servers include a VTAM protocol server, a Data Link Switching (DLSw) protocol server, a Remote Source Route Bridging (RSRB) protocol server, a Telnet (TN3270) protocol server and an Advanced Peer to Peer Networking (APPN) protocol server. Information used by the application protocol server is stored on a NMS repository that is preferably organized as a plurality of tables, each containing protocol-related information associated with a protocol server.

In response to receiving the session parameters from the translation server, the correlation engine creates at least one filter containing searching criteria pertaining to session. For an SNA session, the criteria may comprise one or more of the following elements: Logical Unit (LU) name, LU status, Physical Unit (PU) name, PU status, PU type, is identifier block number/identifier number (IDBLK/IDNUM), media access control (MAC) address (with or without service access point (SAP) address), Control Point (CP) name, Dependent Logical Unit Requester (DLUR) name, Dependent Logical Unit Server (DLUS) name, DLUS status, end station (workstation) TCP/IP host name or address (with or without port number), router TCP/IP host name or address and the desired protocols. The correlation engine passes the filter to an appropriate protocol server to search its table of the repository (or its respective MIB) for information relevant to the request. If found, the protocol server returns a list of sessions (and associated information) matching the filter.

According to the inventive technique, the initial list of sessions returned by a protocol server becomes the working list. Subsequent session lists returned by the protocol servers are merged with the working list. That is if a subsequent session list includes information that matches information about a session in the working list, then the two sessions are considered the same and the session information from each protocol is combined into a single session. If the subsequent session list information does not match the information pertaining to any working list session, then the subsequent session list information is added to the working list as a new session. Partial matching of the session list generally indicates that the sessions are not identical; therefore an additional multiple criteria matching operation is performed to determine whether the sessions are similar. As each session is merged into the working list, flags are asserted to indicate which protocols have information about the session and which filters were satisfied by session returned by the protocol server.

A next stage of the technique involves sorting of the working list session entries based on whether the sessions match all of the filters (the highest order) and by PU name, if present. Each session of the working list that matches all of the filter criteria is flagged as matching the requested filters. The session that matches all of the filters supplied to all of the protocol servers is first in the list. If there are multiple sessions that meet the filter criteria, those sessions are further sorted by PU name. Thereafter, sessions are sorted by the highest number of partially matched filtering criteria. The resulting sessions are returned to the user, preferably in a session table format.

Advantageously, the invention provides an interface for a network operator of a NMS to locate any managed session in its network by entering whatever data it knows about the session. The correlation engine responds by returning a list of sessions sorted by the number of matches. By returning all sessions that match any filter criteria instead of just those sessions that match all of the criteria, the inventive technique avoids issues created when the operator mistakenly enters conflicting information. Moreover, the inventive technique enables the correlation engine to choose a session from potentially many sessions as a correct session for the filtering criteria.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 8 is a table diagram of a list of sessions sorted in accordance with the technique of FIG. 7.

DETAILED DESCRIPTION OF AN ILLUSTRATIVE EMBODIMENT

Figure 5:
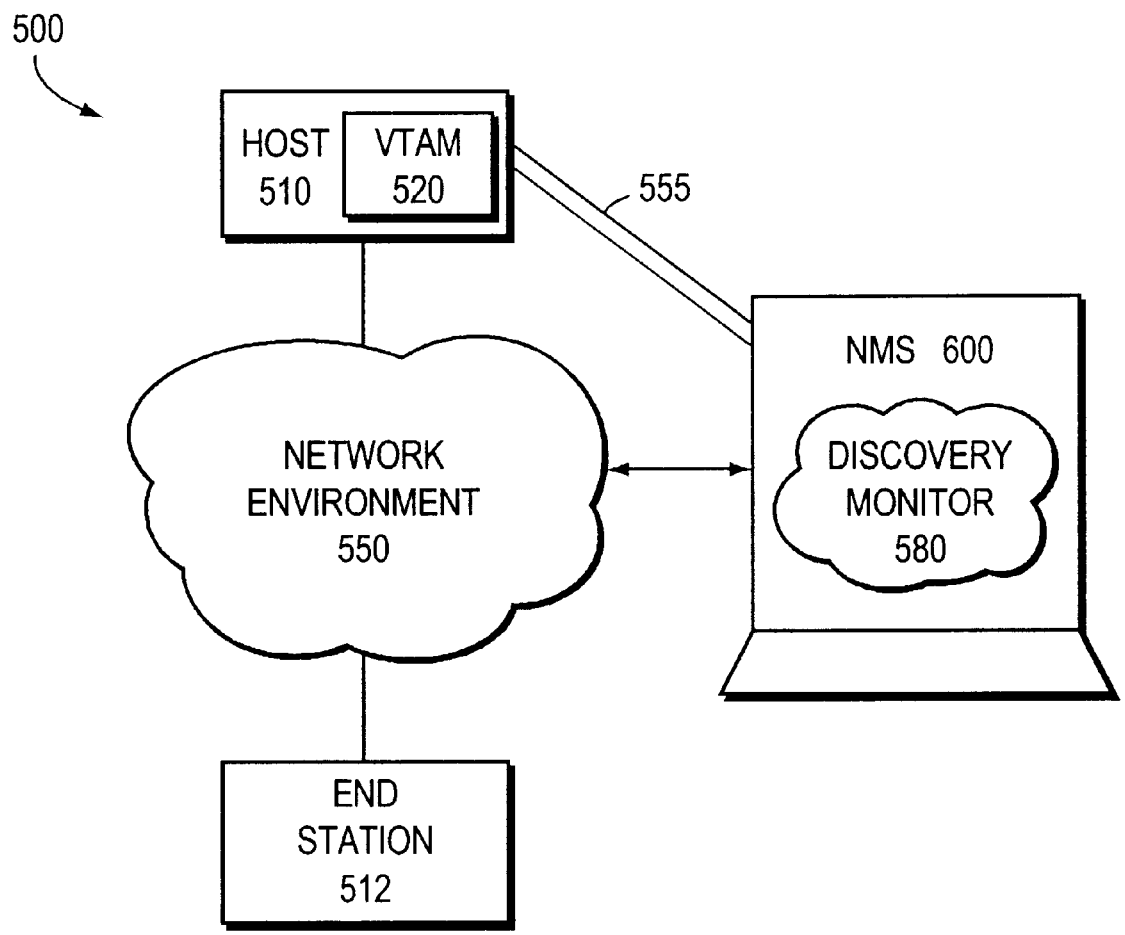
FIG. 5 is a schematic block diagram of a multi-protocol network comprising a plurality of stations, including a network management station (NMS), interconnected by a network environment on which the present invention may advantageously operate.

FIG. 5 is a schematic block diagram of a multi-protocol network 500 comprising a plurality of stations embodied as internetworking computer platforms interconnected by a network environment 550 of communication links and subnetworks. The stations preferably comprise a host computer 510, an end station 512, a network management station (NMS) 600 and a plurality of intermediate stations, the latter being dispersed within the environment 550. The communication links and subnetworks contained within network environment 550 may be configured as wide area networks (WANs), such as a Transmission Control Protocol/Internet protocol (TCP/IP) network, and local area networks (LANs) that support source-route bridging (SRB) operations with respect to the contents of a routing information field (RIF) of a frame.

Figure 1:
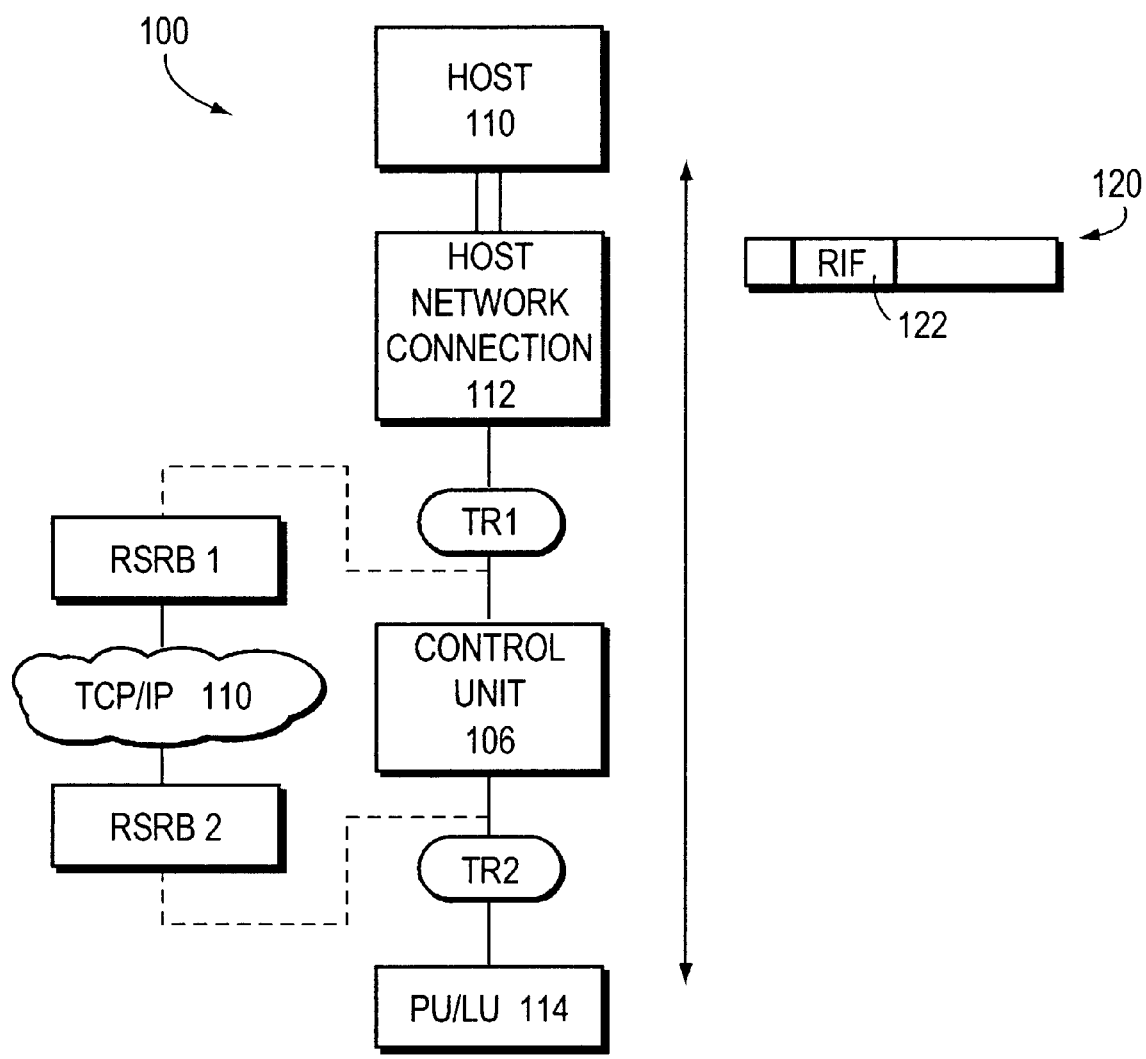
FIG. 1 is a schematic block diagram of a conventional computer network having a host computer and end station coupled to a plurality of token ring local area networks to form a source-route bridge (SRB) network.
Figure 2:
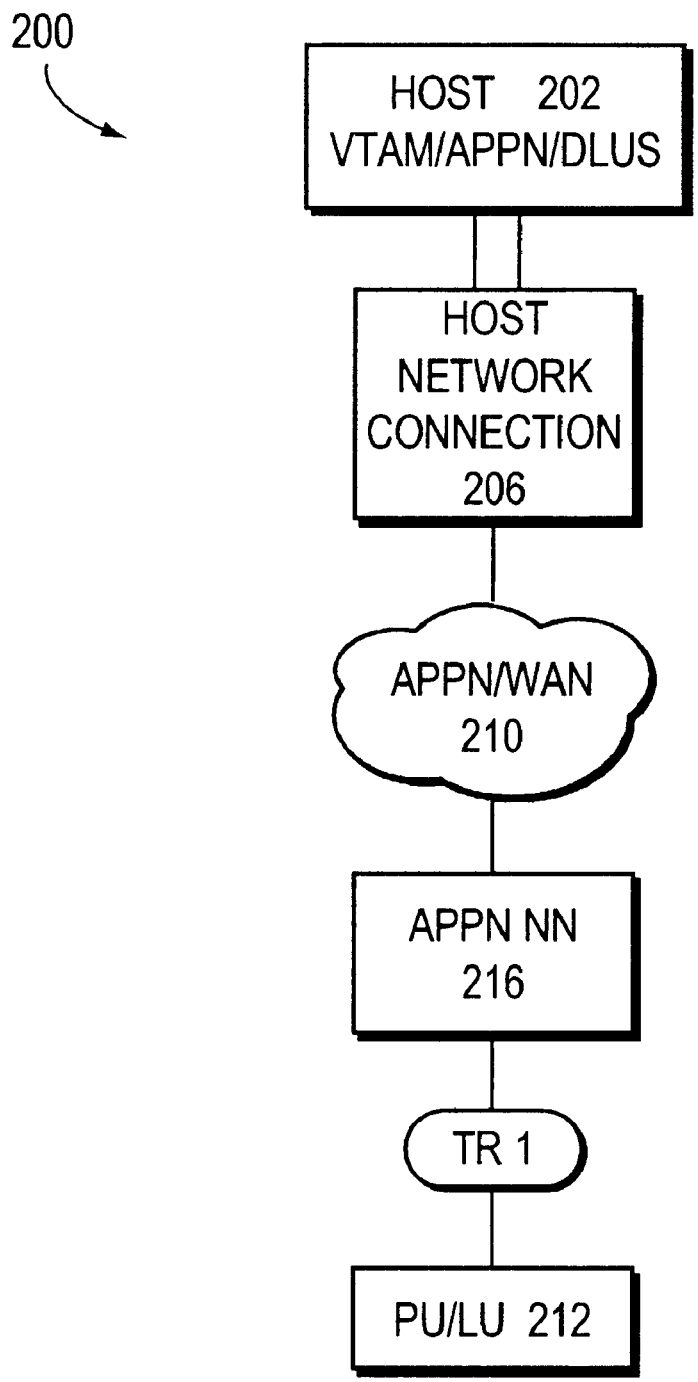
FIG. 2 is a schematic block diagram of a conventional Advanced Peer to Peer Networking (APPN) network including APPN nodes.
Figure 3:
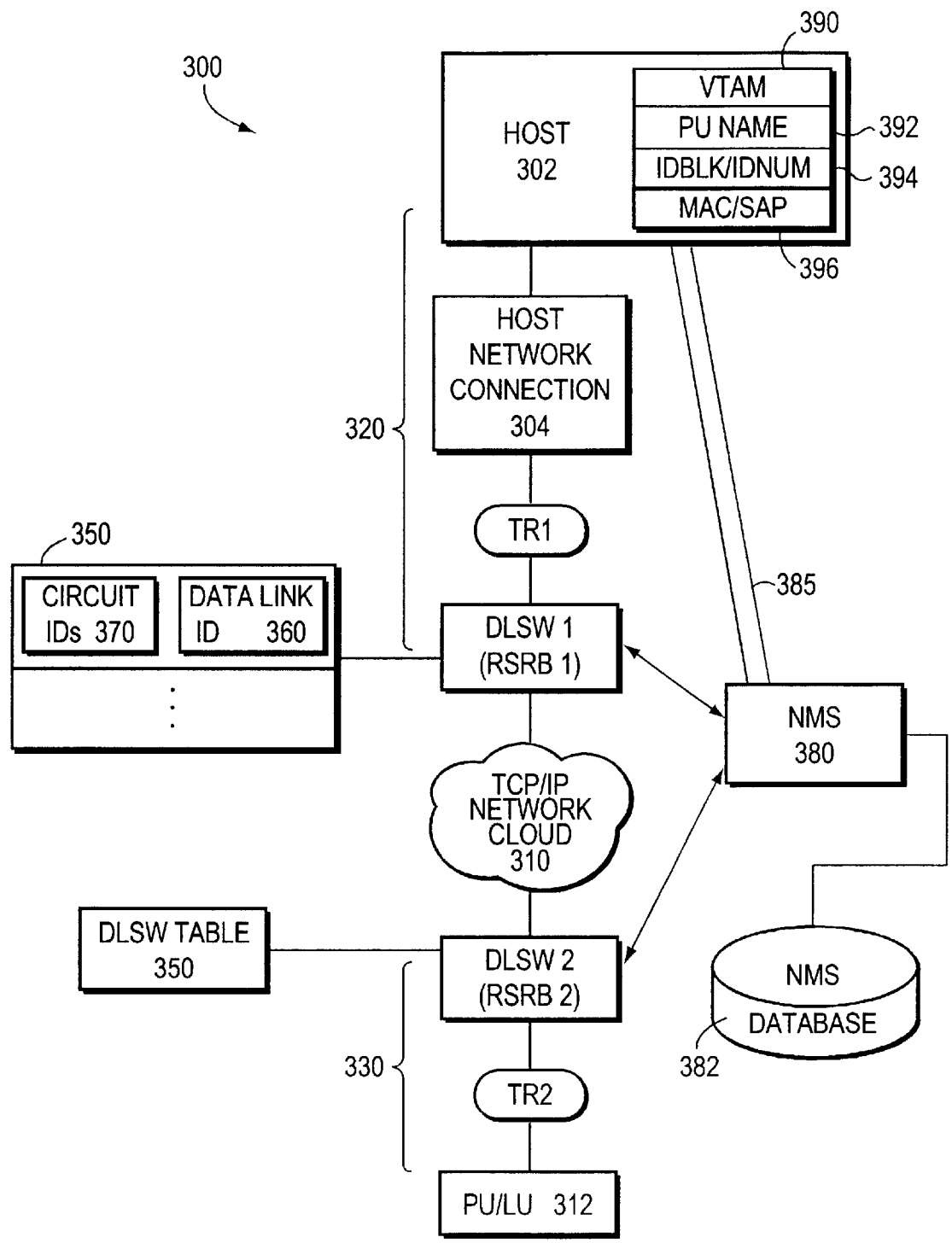
FIG. 3 is a schematic block diagram of a conventional data link switching (DLSW) network.
Figure 4:
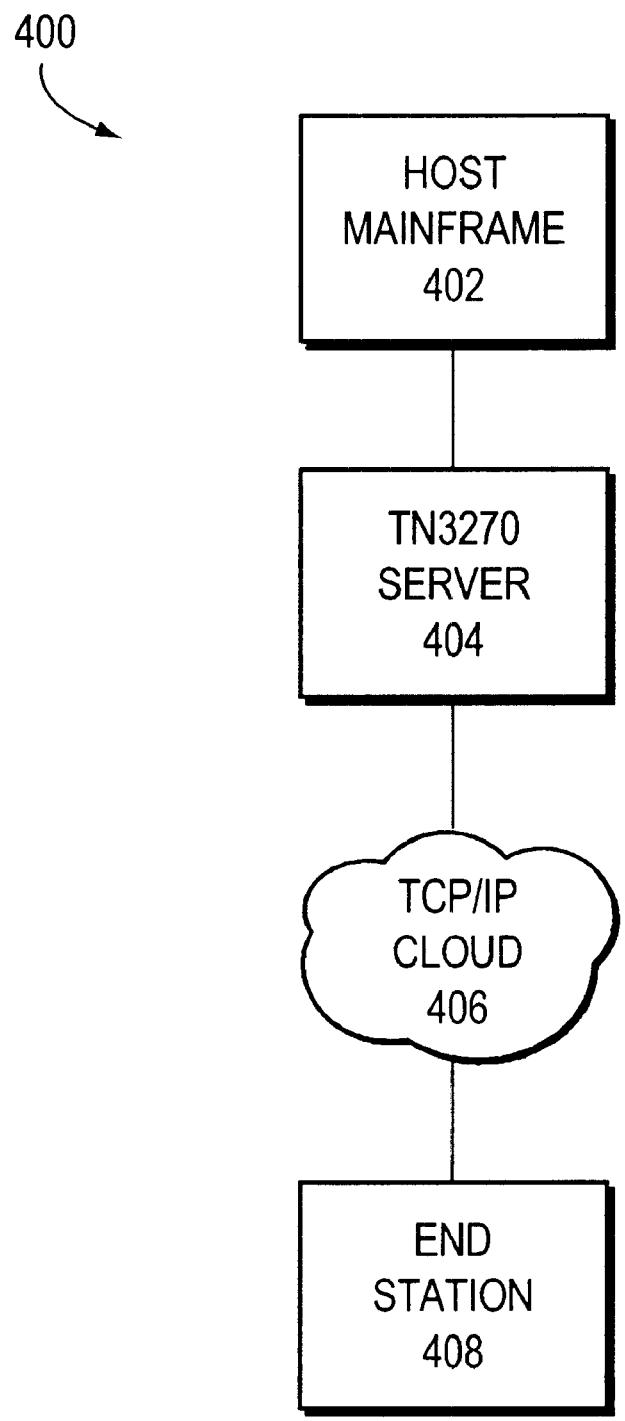
FIG. 4 is a schematic block diagram of a conventional TN3270 network 400.

The present invention described herein generally applies to any type of connection-oriented, multi-protocol network environment 550 wherein the particular intermediate stations carrying data traffic employ protocols that are unknown to a user of the network or an operator of the NMS 600. In the illustrative embodiment, the invention may be directed to a routed network environment that carries Systems Network Architecture (SNA) session traffic via communications equipment, such as control units and/or communication controllers (FIG. 1) or Advanced Peer to Peer Networking (APPN) network nodes (FIG. 2). Moreover, the invention may be illustratively directed to a routed environment 550 that carries encapsulated SNA session traffic over a TCP/IP network using intermediate stations (e.g., routers) that employ protocols such as Data Link Switching (DLSw, see FIG. 3), Remote Source Route Bridging (RSRB, see FIGS. 1 and 3) or Telnet (TN3270, see FIG. 4).

The host computer ("host") 510 is preferably a SNA host entity comprising a mainframe computer coupled to either a channel-attached router, a front end processor or an APPN network node. The end station 512 is also a SNA entity that may comprise an APPN end node or a Physical Unit (PU) functioning in accordance with APPN Dependent Logical Unit Requestor (DLUR) services. In the latter case, the APPN network node (i.e., router) preferably incorporates the DLUR function, while the host 510 incorporates a Dependent LU Server (DLUS) function.

Each station typically comprises a plurality of interconnected elements, such as a processor, a memory and an input/output (I/O) unit. The memory may comprise storage locations addressable by the processor and I/O unit for storing software programs and data structures associated with the inventive session list technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the technique described herein.

The I/O unit, in turn, connects the station to mass storage devices, such as disks, and to the network environment. The NMS may further include a conventional display monitor with a display screen and cursor control devices, such as a keyboard, connected to I/O unit. A window environment, such as a graphical user interface (GUI), is preferably displayed on the screen as a graphical display to facilitate interactions between a network operator and the station. For the NMS, the disk may function as a repository for storing network information as described further herein. Typically, the I/O unit receives information, such as control, address and data signals, from the keyboard or the repository, and provides that information to the processor for display on the screen or for transfer over the network.

The network environment 550 is generally managed by the NMS which, in the illustrative embodiment, is a UNIX workstation configured to execute a network management application. An example of such an application is the Cisco Works Blue Maps and Cisco Works Blue SNA View product set, available from Cisco Systems, Inc. The Cisco Works Blue product set provides a network operator with tools to draw a path of data transferred through the network environment. That is, the product set provides a view of an SNA data session extending from the PU through the network environment to the host. Using the product set, the operator may diagnosis problems by understanding the data path through the network and isolating the problems to segments in the network. The present invention is an extension to the conventional approach for correlating SNA/IP information in a computer network utilizing this product set.

Specifically, the invention comprises a technique that enables a network operator of the NMS to locate a user's session based upon any information that the user can provide (e.g., SNA PU/LU name, IP address, media access control (MAC)/service access point (SAP) address) and without requiring the operator to first determine the protocols used by the session. This allows the operator to quickly diagnose problems by gathering details about the affected session. As noted the illustrative embodiment of the present invention is directed to SNA sessions carried over various protocols used in a computer network. However, it will be apparent to those skilled in art that the invention may be applied to any situation where it is desirable to locate a resource used in different environments. An example is that the present invention could be applied to voice sessions carried over various protocols.

Figure 6:
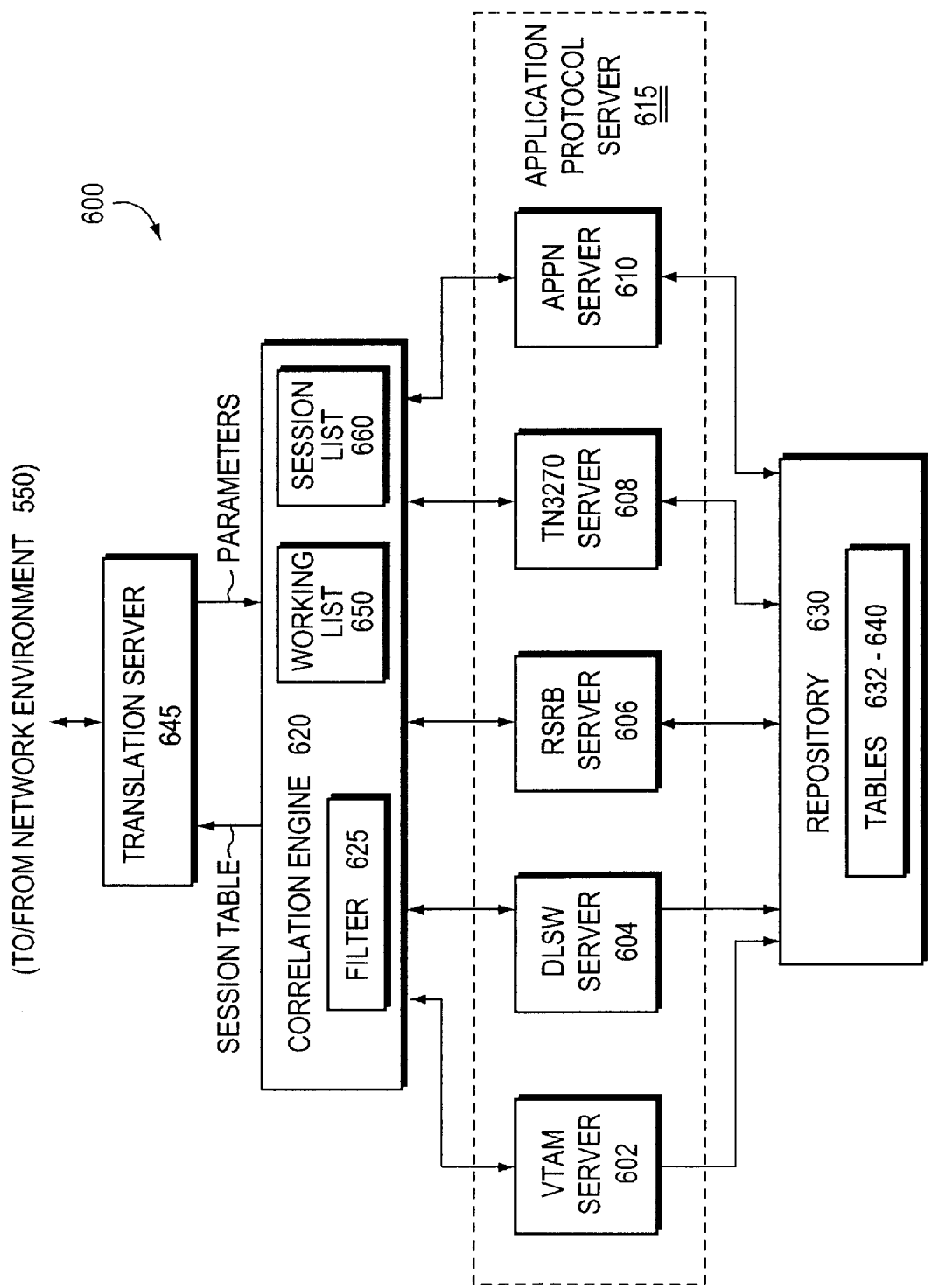
FIG. 6 is a schematic block diagram of the NMS of FIG. 5 comprising a novel correlation engine coupled to a plurality of protocol servers in accordance with the invention.

FIG. 6 is a schematic block diagram of the NMS 600 comprising a novel correlation engine 620 coupled to a plurality of protocol servers. Each protocol server is configured to obtain protocol-related information pertaining to the sessions utilizing its particular protocol. The protocol servers preferably include a VTAM protocol server 602, a DLSw protocol server 604, a RSRB protocol server 606, a TN3270 protocol server 608 and an APPN protocol server 610. The servers 602–610 may be distributed across a plurality of platforms rather than resident on a single NMS. In the illustrative embodiment described herein, however, the servers reside on the same platform as the NMS. The servers may be invoked via direct method calls from the correlation engine 620 using defined applications programming interfaces (APIs).

Information used by the protocol servers is stored on a NMS repository 630 that may be distributed and implemented as an SQL-based server comprising a database of one or more disks and a cache memory. Because the information may not be centrally located, searching may be distributed among various locations in the network as opposed to a single location; accordingly, the invention contemplates the use of independent protocol servers. The repository may be further organized in a variety of manners including as tables (data structures) 632–640, each containing protocol-related information associated with a protocol server 602–610. For example, information relevant to the VTAM and DLSw protocol servers 602 and 604 may be stored on respective tables 632 and 634, while information relevant to the RSRB, TN3270 and APPN protocol servers 606–610 may be stored on respective tables 636–640.

The Cisco Works Blue SNA View tool has a mainframe component and a UNIX workstation component that allows the NMS to retrieve SNA-specific information about the host and PU entities. The NMS 600 communicates with the host over a TCP/IP (or LU 6.2) "pipe" connection 555 to acquire the SNA-specific information available from a virtual telecommunication access method (VTAM) table 520 at the host. The SNA View mainframe component includes a discovery monitor process 580 that queries VTAM with discovery requests for retrieving the SNA-specific information. The information may include (i) MAC/SAP addresses of the host and PU (or the DLUS host and the DLUR router), (ii) the PU name (or DLUR name for the PU), (iii) the PU status, (iv) PU type, (iv) a control point (CP) name of the PU; (v) an identifier block number/identifier number (IDBLK/IDNUM) of the PU and (vi) RIF, if present.

The discovery monitor 580 loads the VTAM-retrieved information onto a VTAM portion 632 (i.e, table) the repository. The VTAM table 632 may be organized as a PU table and a LU table, each of which is indexed by PU name. The PU table may include information such as PU name, PU status and PU type, whereas the LU table may include LU name, PU name and LU status information. The discovery monitor process populates the PU and LU tables, which are thereafter accessed the VTAM protocol server 602.

The remaining protocol servers access information from their respective tables which are organized according to the protocols. In the case of the DLSw protocol, for example, there is a DLSw circuit table 634 containing information, such as DLSw circuit IDs and the DLSw peer routers establishing those circuits, known to the DLSw protocol server 604. This information is collected using conventional simple network management protocol (SNMP) management information bases (MIBs) associated with each protocol in accordance with various discovery/poller processes and then populated according to the structure of the repository. Examples of MIBs that may be advantageously used with the present invention include a DLSw MIB disclosed in *Request for Comment* (*RFC*) 2024, an IBM-6611-APPN-MIB disclosed in *RFC* 1593, an APPN MIB disclosed in *RFC* 2455, a TN3270 MIB disclosed at <http://www.cisco.com/public/mibs/v2-v1/CISCO-TN3270SERVER-MIB-VISMI.my>, a DLUR MIB described in *RFC* 2232 and a RSRB MIB disclosed at <http://www.cisco.com/public/mibs/v2-v1/CISCO-RSRB-MIB.my>, each of which is hereby incorporated by reference in its entirety.

In the illustrative embodiment the protocol servers (VTAM, DLSw, APPN, RSRB and TN3270) preferably run under a single application protocol server "daemon" 615 configured to access the repository, which is populated by a plurality of discovery/poller daemons. The daemons are processes that execute in the background and perform work without user intervention. The discovery/poller daemons execute on an operating system (e.g., UNIX) and utilize SNMP to acquire information needed to populate the various protocol tables. After populating the respective tables with the acquired information, the protocol servers access the tables to search on that information. The protocol servers are preferably implemented as object-oriented C++ classes that define certain APIs configured to retrieve information.

The NMS further includes a translation server process 645 for translating service requests into session parameters for use by the correlation engine 620. The service requests are issued by a network user (customer) concerning a session and includes any information that the user can provide about the session. In the illustrative embodiment, the translation server may be implemented as a web-based management tool comprising a web server process executing on the NMS and configured to service hypertext markup language (HTML) requests received over the TCP/IP network (such as the Internet). Here, a user (e.g., workstation) issues an HTML service request to the server 645 by sending a message to a uniform resource locator (URL) address of the NMS. The web server responds by providing an HTML page to the user which inputs the requested information in HTML format and forwards it to the server 645. The web server translates the request into a set of session parameters, examples of which include a PU name, MAC/SAP address of the workstation, router name and DLUS name. The router name may comprise a domain name system (DNS) name (or IP address).

Figure 7:
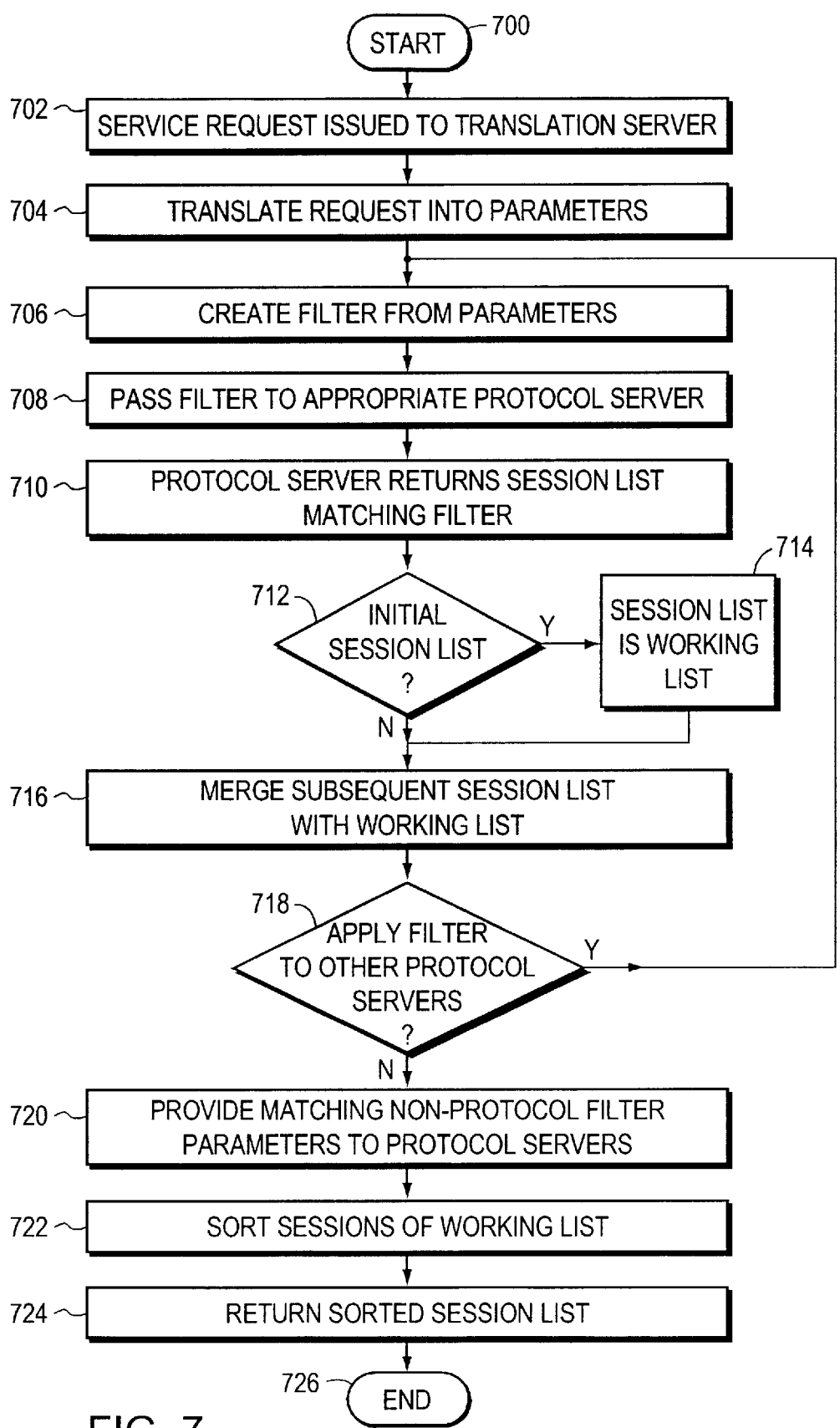
FIG. 7 is a flowchart illustrating the sequence of steps involved in a novel session list technique of the present invention.

FIG. 7 is a flowchart illustrating the sequence of steps involved in the novel session list technique (process) of the present invention. The process starts at step 700 and proceeds to Step 702 where a user issues a service request, such as an HTML request, to the translation server of the NMS. In Step 704 the server translates the request into a list of all sessions having, e.g., the following parameters: a PU name of ABC*, a workstation MAC address of 0, a DLUS name Y and passing through a router having a name Charlie. The server 645 forwards these parameters to the correlation engine 620 which, in Step 706, creates a list of filtering data structures or "filters" 625 from the parameters. As used herein, a filter pertains to any searching criteria that can be obtained about a session. In Step 708 the filter 625 is provided to a protocol server to search its portion of the repository (or its respective MIB) for information relevant to the request.

Specifically, the correlation engine 620 scans the parameters and creates filters 625 for those protocol servers that it has determined can provide information relating to the request. In this respect, the correlation engine functions as a "front-end" to the application protocol server 615. Since not all of the filters apply to all of the protocols, the correlation engine may pass a subset of the filter list to each protocol server. If a protocol server cannot handle the filter criteria, it is not called by the correlation engine. In the illustrative embodiment, the VTAM protocol server is always passed a filter list and is expected to return a list of sessions for each specified protocol because all SNA sessions are VTAM sessions whether or not they utilize another protocol.

Thus based on the nature of the requested information, the correlation engine may determine that, e.g., VTAM recognizes PU names and MAC addresses, but not router or DLUS names. Therefore the correlation engine 620 creates a filter 625 for the VTAM protocol server 602 that contains only the PU name ABC* and MAC address 0. Note that wild cards * are allowed on any fields which represent names. The protocol server searches its respective table and if it finds PUs meeting that name and address criteria, it responds to the engine with a list of sessions in Step 710. If a protocol filter is not supplied, all sessions that match the filter criteria are included in the session list regardless of the protocols used by the sessions. Note that it is possible to explicitly request sessions that match one or more protocols or that do not use one or more protocols.

According to the inventive technique, the initial list of sessions returned by a protocol server is designated the working list 650 (Step 712). Since the VTAM protocol server responds with the first list returned by a protocol server, that returned list becomes the working list in Step 714. Note that the size of the working list is dependent on the particular filtering criteria. For example if a filter of (STATUS=ACTIVE) is included it is possible that more than one session may be included in the list. After the initial session list is established, the correlation engine merges subsequent session lists 660 returned by protocol server with the working list 650 in Step 716.

Merging of a subsequent session list with the working session list operates in the following manner. If the subsequent session list 660 includes information that matches information about a session in the working list 650, then the two sessions are considered the same and the session information from each protocol is combined into a single session. If the subsequent session list information does not match the information pertaining to any working list session, then the subsequent session list information is added to the working list as a new session.

In general, each protocol acquires different information about a given session; therefore, the inventive technique further includes correlation of the information to identify whether a session returned by the protocol servers is the same as a session in the working list. For correlation purposes, information maintained in the VTAM table 632 includes LU name, PU name, source and destination MAC/SAP addresses, IDBLK/IDNUM, CP name and routing information. Correlation with APPN and TN3270 sessions can be achieved using the PU name, MAC/SAP addresses, DLUR name, IDBLK/IDNUM and CP name. The DLSw table information used for correlation may include MAC/SAP addresses, while RSRB sessions may be correlated using routing information.

Referring again to the creation of filters, the correlation engine may determine that DLSw recognizes MAC/SAP addresses and router names, but not PU or DLUS names. Therefore the correlation engine 620 creates a filter 625 for the DLSw protocol server 604 that contains only the MAC address and router name. The DLSw server 604 thus searches its portion (table) 634 of the repository for sessions having the MAC address 0 and passing through the router Charlie. If found, the protocol server 604 returns a session list 660 having SNA sessions that meet the filter criteria.

The correlation engine 620 then merges the two lists by scanning the working list to determine whether there are already session entries similar to the sessions provided by the DLSw protocol server. For example if only one session in the DLSw list has a MAC/SAP address that matches a session in the VTAM working list, then it can be assumed that the two sessions are similar. However if either list has more than one session with the same MAC/SAP address, it cannot be determined which of those sessions are similar so the DLSw sessions are added to the working list as new sessions.

In Step 718, the above process is repeated for each protocol server; that is, the correlation engine determines whether there is any filter that can be applied solely to a protocol server and, if so, it is forwarded to that protocol server. The protocol server, in turn, determines whether there are any sessions that meet the filter criteria and, if so, those sessions are merged or added as described above. In the case of the APPN protocol server 610, the APPN protocol recognizes MAC addresses, router names and DLUS names. The correlation engine 620 thus creates a filter 625 for the server 610 based on the MAC address 0, router name Charlie and DLUS name Y criteria. The APPN protocol server 610 then scans its portion 640 of the repository 630 to decide whether there are any sessions matching the filter criteria.

As noted, the merging operation also comprises some degree of correlation. For example, VTAM recognizes PU names and associated extensions that identify the host 510 (VTAM) from which the PU names were obtained. When the VTAM information is initially loaded onto the repository, the PU names are qualified by the mainframe from which they were obtained. APPN, on the other hand, only recognizes PU names and does not understand the associated extensions. APPN does, however, recognize an IDBLK/IDNUM and CP name associated with the PU name. The APPN data may be correlated with VTAM data based on PU name along with IDBLK/IDNUM or CP name.

Partial matching of the session list 660 generally indicates that the sessions are not identical; therefore an additional multiple criteria matching operation is performed to ensure that sessions are similar. If this operation does not confirm the similarity of the sessions, then the new session is added to the list. For example, the VTAM protocol server returns a session in the working list having a PU name of ABC1 and a CP name XYZ. In addition, the APPN protocol server returns a session with a PU name of ABC1 and a CP name of DEF. It is apparent that the sessions are not the same and, as a result, the working list is expanded to include two sessions having the PU name ABC1.

In general whenever a protocol session list 660 is merged with the working list 650, both correlation and merging operations occur. In the case of correlation, a determination is made whether a session returned by a server is already present on the working list based on any type of filtering criteria; if so, the session is merged into the working list. If the protocol server returns additional information about a session in the working list and it is determined that the two sessions match, the additional information is added to the working list session entry. For example, the APPN protocol server 610 may provide a DLUS name that was not previously associated with the matching working list session. As sessions are merged in connection with this technique, more information is provided for each session in the working list 650.

Furthermore as each session from a server is merged into the working list, a first flag may be asserted for each merged working list entry denoting the protocol that was merged into the entry. In addition, a second flag may be asserted denoting an additional filter was matched within the session entry. Assertion of the flags indicate which protocols have information about ("knowledge of") the session and which filters were satisfied by the session returned by the protocol server. Refer again to the example of the filter request for all PU names starting with ABC* and whose sessions traverse the router Charlie. Flags are set for each session returned by the VTAM protocol server thereby indicating the session is known to that server and that the session satisfies the ABC* PU name filter. Session flags are also set for each session returned by the DLSw protocol server indicating that the session is known to the DLSw server and that it satisfies the router name Charlie filter. Flags are further asserted for those DLSw sessions that are merged with the existing VTAM sessions thus indicating that the sessions are known to both protocols and that they pass both filter criteria.

Referring again to the previous example, the RSRB protocol server 606 may be provided with a filter 625 that includes a router name parameter. The RSRB protocol server searches its portion 636 of repository for all sessions matching the router name and, if a session is found, the merger/correlation operations are performed. The additional information provided by the RSRB protocol server 606 may include RIF information that is merged into a matching session entry. The RIF information may be used for correlation between the working list and the SNA-specific information supplied by the VTAM table 520 over the pipe 555 when searching for a PU name.

Further to the previous example, the TN3270 protocol server 608 has knowledge of PU and router names; therefore a PU and router name filter 625 is provided to the server 608. The TN3270 protocol server searches its table 638 and if it finds sessions meeting the filter criteria, it responds to the engine with a list of SNA sessions that have a PU name of ABC* and pass through the router Charlie. The sessions of the list are similarly merged and correlated by the correlation engine 620 to produce a single working list 650 of sessions. This completes the merger/correlation stage of the inventive technique.

After invoking all protocol servers that support the requested filters, Step 720 ensures that the sessions matching the non-protocol filters are known by the requested protocol servers. This stage of the technique addresses the problem related to, e.g., a request for all PU names that start with ABC* and that utilize a particular protocol for transport. For this example, the particular protocol is the DLSw protocol and the non-protocol filter is the PU name filter. Since the DLSw protocol server has no knowledge of PU names and cannot handle the PU name filter, it is not called during the first pass of protocol server invocation. Only the VTAM protocol server is invoked and it returns a list of sessions that match the PU name filter.

According to the invention, a determination is then made as to which of the returned sessions are DLSw sessions. The MAC/SAP addresses (if present) of the returned sessions are passed to the DLSw protocol server for comparison with its locally-stored MAC/SAP addresses of sessions using the DLSw protocol. A flag is then asserted for each matching session, thereby indicating that both VTAM and DLSw protocols have knowledge of the session.

The next stage of the technique involves sorting of the working list session entries based on whether the sessions match all of the filters (the highest order) and by PU name, if present (Step 722). Each session of the working list that matches all of the filter criteria (including the desired protocols, if present) is flagged as matching the requested filters. The session that matches all of the filters supplied to all of the protocol servers is first in the list. If there are multiple sessions that match all of the filters, those sessions are further sorted by PU name.

Thereafter, sessions are sorted by the highest number of partially matched filtering criteria (i.e., filters and protocols).

For example if the request is directed to sessions having PU names starting with ABC*, an active state, a PU type 2.0 and that utilize the DLSw protocol, there may be sessions in the list that do not match all of these filters. That is, a session may have a PU name starting with ABC*, have a PU of the type 2.0 and use the DLSw protocol, but is inactive. This session thus matches three out of the four filters. Those sessions that match all of the filters appear higher in the list than the session matching three filters, which is followed by sessions that match two filters.

In Step 724 the resulting sorted sessions are returned to the user (via the web server 645) in a session table format similar to that shown in Table I of FIG. 8. A column heading is present in the table only if at least one session has data for that heading. For example, if no information is provided about a DLUS name for any session, that column heading does not appear in the table. Multiple sessions are listed in table format because the user may need to select a particular session. Accordingly, the user is provided a list of sessions that match the requested filtering parameters and the user selects the session that may assist in diagnosing the problem with the network. If the resulting table comprises only one session, the information provided to the user may include a graphical depiction of that session. The process then ends in Step 726.

Advantageously, the invention provides an interface for a network operator of a NMS to locate any managed session in its network by entering whatever data it knows about the session. As networks grow more complex with respect to the number of protocols used, it becomes increasingly important for an operator that takes an initial call from a customer to be able to gather as much data as possible regarding the problem. The operator typically does not have knowledge (apart from the information provided by a customer) of the protocol used by a particular session of a multi-protocol network. Without the present invention, the operator typically invokes a management application for each protocol to determine whether that application is "aware" of the session. The present invention provides a method for allowing the application to do that work for the user.

By returning all sessions that match any filter criteria instead of just those sessions that match all of the criteria, the inventive technique avoids issues created when the operator mistakenly enters conflicting information. For example, a customer may call a service operator with a problem concerning a session and provide the operator with a PU name and MAC/SAP address. If the operator mistypes the MAC/SAP address but correctly enters the PU name and there are no sessions that match the MAC/SAP address, a list may still be returned with a session that matches the PU name. The session is flagged as not matching the filter criteria since it only matched one out of the two filters, but the operator is returned a session and can confirm with the customer that the address is correct.

Continuing with the above example, it is desirable for the operator to enter both the PU name and the MAC/SAP address because the operator should not have to know about the protocols known to the NMS. For example it is possible the NMS does not have a way of obtaining any information regarding VTAM sessions, but can obtain information about APPN, DLSw, RSRB and TN3270 sessions. If the customer session only uses the DLSw protocol to encapsulate a SNA (VTAM) session, the APPN, RSRB and TN3270 protocols have no knowledge of that session. If a user only provides the PU name to the correlation engine, the engine is unable to locate the session since the DLSw protocol server does not understand PU names. If the operator correctly enters only a MAC/SAP address, the session would be found but the intent is to remove the requirement for the operator to need to know what information to enter. The present invention allows the operator to enter any and all of the information it knows and the correlation engine responds by returning a list of sessions sorted by the number of matches. Moreover, the inventive technique enables the correlation engine to choose a session from potentially many sessions as a correct session for the filtering criteria.

While here has been shown and described an illustrative embodiment for identifying a session of a multi-protocol network without knowledge of the protocols used by the session, it is to be understood that various other adaptations and modifications may be made within the spirit and scope of the invention. In an alternative embodiment of the present invention, one or more protocols may be specified as filtering criteria with which a user may obtain session information. For example, the user can request all sessions relating to a PU name X and that are running DLSw and RSRB protocols. Here, the correlation engine need only generate filters for the DLSw and RSRB protocol servers, thereby resulting in a more efficient process since not all protocol servers need to be polled.

In this example, however, the DLSw protocol server has no knowledge of PU names although the user is requesting information about a DLSw session. This aspect of the inventive technique requires that the VTAM protocol server be queried to return all information that it has pertaining to a particular PU name. The VTAM protocol server may return, for example, MAC/SAP address information along with RIF information pertaining to the PU name. As noted, the VTAM protocol server is queried and issued a filter for any request from a user because all of the sessions are SNA sessions.

Although the illustrative embodiment is directed to SNA sessions propagating through various network configurations, the invention may likewise apply to any other type of protocol including voice/data/video-encapsulation type protocols. For example, the applications server daemon may include a "Voice-over-IP" protocol server, a "Video-over-DLSw" protocol server and other similarly characterized voice/data/video-encapsulated protocols. Issues similar to that described in the illustrative embodiment may arise because of the plurality of voice connections over the network and the fact that a user may not know which protocol is employed by the particular network session. Accordingly, the same inventive methodology described herein would apply to these types of encapsulation sessions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for identifying a data session flowing through entities of a multi-protocol network without requiring knowledge of the protocols used by the session, the method comprising the steps of:

creating one or more filters at a correlation engine of a network management station (NMS) for use by one or more protocol servers of the NMS;

obtaining protocol-related information pertaining to the session at the protocol servers, the protocol-related information matching at least one of the filters;

merging the obtained protocol-related information into a list of session entries;

sorting the session entries of the merged list according to a number of matching filters; and providing a list of sorted session entries to the user.

2. The method of claim 1 further comprising the step of translating a service request issued from a user of the network to session parameters.

3. The method of claim 2 wherein the step of creating comprises the step of creating the filters from the translated session parameters.

4. The method of claim 1 wherein the step of obtaining comprises the steps of:

organizing a NMS repository as a plurality of tables, each table containing protocol-related information associated with a protocol server; and searching the NMS repository for the protocol-related information pertaining to the session.

5. The method of claim 4 wherein the step of obtaining further comprises the step of designating an initial list of sessions returned by a protocol server as a working list.

6. The method of claim 5 wherein the step of merging comprises the step of merging subsequent session lists with the working list.

7. The method of claim 6 wherein the step of merging further comprises the steps of:

combining a session from the subsequent list into a single session of the working list if the protocol-related information about the subsequent list session matches the protocol-related information about the working list session; and adding the session from the subsequent list to the sessions of the working list if the protocol-related information about the subsequent list session does not match the protocol-related information pertaining to any of the working list sessions.

8. The method of claim 7 wherein the step of merging further comprises the step of asserting predetermined flags to indicate which protocols have information about the session and which filters are satisfied by the session.

9. The method of claim 8 wherein the step of sorting comprises the step of sorting the sessions of the working list such that the session that matches all of the filters supplied to all of the protocol servers is first in the list.

10. The method of claim 9 wherein the step of sorting further comprises, if multiple sessions match all of the filters, sorting the sessions of the working list by physical unit (PU) name.

11. The method of claim 10 wherein the step of sorting further comprises the step of sorting any remaining sessions of the working list by highest number of partially matched filtering criteria.

12. Apparatus for identifying a data session flowing through entities of a multi-protocol network without requiring knowledge of the protocols used by the session, the apparatus comprising:

a translation server of a network management station (NMS) coupled to the network, the translation server configured to translate a service request issued from a user of the network to session parameters;

a correlation engine coupled to the translation server and adapted to create one or more filters from the session parameters; and an application protocol server coupled to the correlation engine, the application protocol server comprising a plurality of protocol servers for receiving the filters from the correlation engine and for obtaining protocol-related information responsive to the received filters.

13. The apparatus of claim 12 further comprising a repository for storing the protocol-related information obtained by the protocol servers.

14. The apparatus of claim 13 wherein the repository comprises a plurality of table structures, each containing the protocol-related information associated with a protocol server.

15. The apparatus of claim 14 wherein the protocol servers include a virtual telecommunication access method (VTAM) protocol server.

16. The apparatus of claim 15 wherein the protocol servers further include one of a data link switching (DLSw) protocol server, a remote source route bridging (RSRB) protocol server, a telnet protocol server and an advanced peer to peer networking (APPN) protocol server.

17. The apparatus of claim 15 wherein the protocol servers further include a data link switching (DLSW) protocol server, a remote source route bridging (RSRB) protocol server, a telnet protocol server and an advanced peer to peer networking (APPN) protocol server.

18. A computer readable medium containing executable program instructions for identifying a data session flowing through entities of a multi-protocol network without requiring knowledge of the protocols used by the session, the executable program instructions comprising the program instructions for:

creating one or more filters at a correlation engine of a network management station (NMS) for use by one or more protocol servers of the NMS;

obtaining protocol-related information pertaining to the session at the protocol servers, the protocol-related information matching at least one of the filters;

merging the obtained protocol-related information into a list of session entries;

sorting the session entries of the merged list according to a number of matching filters; and providing a list of sorted session entries to the user.

19. The computer readable medium of claim 18 further comprising program instructions for translating a service request issued from a user of the network to session parameters.

20. The computer readable medium of claim 19 wherein the program instructions for creating comprises program instructions for creating the filters from the translated session parameters.

* * * * *